(No Model.)

C. D. SHRIEVES & J. E. COOK.
METHOD OF LAYING UNDERGROUND ELECTRIC WIRES.

No. 276,486. Patented Apr. 24, 1883.

WITNESSES:
A. P. Grant
W. F. Kircher

INVENTORS:
Charles D. Shrieves,
John E. Cook,
BY John A. Wiedersheim
ATTORNEY.

N. PETERS. Photo-Lithographer, Washington, D. C.

UNITED STATES PATENT OFFICE.

CHARLES D. SHRIEVES AND JOHN E. COOK, OF PHILADELPHIA, PA.

METHOD OF LAYING UNDERGROUND ELECTRIC WIRES.

SPECIFICATION forming part of Letters Patent No. 276,486, dated April 24, 1883.

Application filed January 10, 1883. (No model.)

*To all whom it may concern:*

Be it known that we, CHARLES D. SHRIEVES and JOHN E. COOK, both citizens of the United States, residing in the city and county of Philadelphia, State of Pennsylvania, have invented a new and useful Improvement in the Method of Laying Underground Electric Wires, which improvement is fully set forth in the following specification and accompanying drawings, in which—

Figure 1:
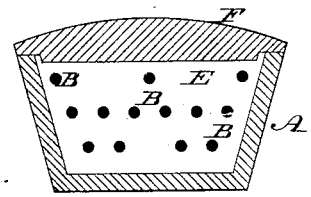
Figure 2:
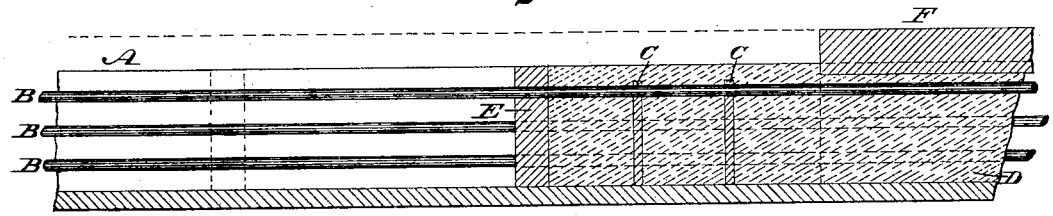
Figure 3:
Figure 4:
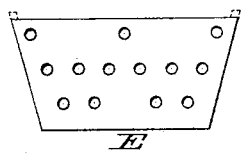

Figure 1 is a vertical section of an underground conduit embodying our invention. Fig. 2 is a horizontal section thereof. Figs. 3 and 4 are views of a detachable portion thereof.

Similar letters of reference indicate corresponding parts in the several figures.

Our invention consists of a method of laying an underground conduit for electric wires, whereby it is water-proof and comparatively indestructible, and the wires are perfectly insulated, all as will be hereinafter set forth.

Referring to the drawings, A represents a trough which is formed of earthenware or other suitable material, and adapted to be placed in a suitable trench in the ground; and B represents the electric wires which are inclosed in said trough.

C represents a stretcher which is sustained within the trough and supports the wires B.

D represents a filling which is poured into the trough and incloses the wires and stretchers, and E represents a perforated gate which is employed in the operation of laying the conduit, the same corresponding to the inner contour of the trough.

The number of wires desired is passed through the openings in the gate E, and the latter located within the trough at a suitable distance from the starting-point of the conduit. Wherever the wires sag there is placed under them, at the proper localities, the stretchers C, it being noticed that said stretchers are notched in zigzag or staggered form, as shown in Fig. 3, so as to hold the wires separated one from another. The filling, which is of a soft or plastic condition, is now poured into the trough, so as to envelop the wires and stretchers and fill the trough from the starting-point to the gate E. The lid or cover F may now be applied, and one section of the conduit is completed. When the filling is fully set the gate E is shifted the distance required to complete the next section, or relatively to the amount of filling it may be desired to apply in each length or section of the conduit, the portion of the wires not yet enveloped by the filling remaining sustained by the gate, the latter occupying its new position. Additional stretchers are applied, if required, and filling is then poured into the trough so as to occupy the same from the end of the filling as heretofore set to the place of the new location of the gate, thus continuing the envelopment of the wires and stretchers wherever the latter exist. Another length of the lid or covering is fitted on the trough, thus completing another section of the conduit, the operations being repeated until the conduit is completed.

It will be seen that as the conduit is thus laid in sections the filling of each section is solid and uniform, each wire being fully and properly enveloped by the filling, air-holes and gaps being avoided, and the work may be inspected as it progresses, whereby the insulation is complete, water and moisture cannot reach the wires, the wires are uniformly sustained throughout the trough, and the conduit is comparatively indestructible, the conduit being furthermore easily and economically laid, as it is formed of parts which are few in number and simple in construction. The filling we employ is sulphur and dry sand, which are united in a hot state, and so poured into the trough, entirely filling the same, flowing close into the corners and against the sides of said trough, and effectively enveloping the wires, said filling being of a hard, water-proof, and indestructible nature, easily laid, quickly setting and retaining its position. The filling is poured into the trough at a temperature of about 250°, and when the lid or cover F is applied it is cemented to the trough by the filling, so that the trough, wires, and lid are bound together, forming a solid mass.

While we have designated dry sand as an ingredient of the filling, we may use powdered glass or any silicious material.

As the sulphur is used in a melted state, it forms an instantaneous chemical combination with the surface of the embedded wires, thus protecting them chemically from moisture, which in the slightest degree proves fatal to insulation. Furthermore, as sulphur is of crystalline nature, we add the silicious material in order to break up the crystals and render the filling homogeneous, which is perfectly accomplished.

Our entire system can be laid and operated economically, avoids the use of man-holes, and prevents tampering with the wires.

Having thus described our invention, what we claim as new, and desire to secure by Letters Patent, is—

The method of laying and insulating underground-telegraph wires, consisting in locating a suitable trough, placing therein a movable perforated gate, through which the wires are passed, placing stretchers notched in staggered form on the bottom of the trough and locating the wires therein, pouring into the trough a filling in a hot state, which envelops the wires for a distance limited by said gate, and also envelops the stretchers, then applying the lid to the trough while the filling is hot, so that they adhere, and the lid is thus sealed, and then shifting the gate and repeating the operations for another length, substantially as set forth.

CHARLES D. SHRIEVES.
J. E. COOK.

Witnesses:
EUG. M. SMYSER,
JNO. B. TURNER.